(12) United States Patent
Rakshit et al.

(10) Patent No.: US 11,553,038 B1
(45) Date of Patent: Jan. 10, 2023

(54) OPTIMIZING DEVICE-TO-DEVICE COMMUNICATION PROTOCOL SELECTION IN AN EDGE COMPUTING ENVIRONMENT

(71) Applicant: KYNDRYL, INC., New York, NY (US)

(72) Inventors: Sarbajit K. Rakshit, Kolkata (IN); Pritpal S. Arora, Bangalore (IN); Laxmikantha Sai Nanduru, Secunderabad (IN)

(73) Assignee: KYNDRYL, INC., New York, NY (US)

( * ) Notice: Subject to any disclaimer, the term of this patent is extended or adjusted under 35 U.S.C. 154(b) by 0 days.

(21) Appl. No.: 17/508,045

(22) Filed: Oct. 22, 2021

(51) Int. Cl.
*H04L 41/5022* (2022.01)
*H04L 67/1001* (2022.01)

(52) U.S. Cl.
CPC ...... *H04L 67/1001* (2022.05); *H04L 41/5022* (2013.01)

(58) Field of Classification Search
None
See application file for complete search history.

(56) References Cited

U.S. PATENT DOCUMENTS

| | | | |
|---|---|---|---|
| 9,239,711 B1 * | 1/2016 | Mistry | G06F 8/443 |
| 9,474,018 B2 | 10/2016 | Akhtar et al. | |
| 11,336,536 B1 * | 5/2022 | Decker | H04L 41/0813 |
| 2005/0273668 A1 | 12/2005 | Manning | |
| 2007/0067440 A1 | 3/2007 | Bhogal et al. | |

(Continued)

FOREIGN PATENT DOCUMENTS

| | | |
|---|---|---|
| CN | 104349462 | 2/2015 |
| CN | 109981340 | 7/2019 |

(Continued)

OTHER PUBLICATIONS

Yi et al. "Joint Resource Allocation for Device-to-Device Communication Assisted Fog Computing", Nov. 8, 2019, 14 pages.

(Continued)

*Primary Examiner* — Joshua Joo
(74) *Attorney, Agent, or Firm* — Erik Swanson; Andrew M. Calderon; Calderon Safran & Cole P.C.

(57) ABSTRACT

A method for optimizing device-to-device communication protocol selection in an edge computing environment is provided. The method includes: receiving a request for a service from a user device, wherein the computing system is one of plural edge computing devices in an edge computing environment; determining computational tasks performed in providing the service; selecting, using a machine learning model, a set of the edge computing devices to perform the computational tasks and communication protocols for the set of the edge computing devices to use while performing the computational tasks, wherein the machine learning model is configured to select the set of the edge computing devices and the communication protocols based on minimizing a time to perform the computational tasks; and sending instructions to perform the computational tasks, thereby causing the set of the edge computing devices to perform the service in response to the request from the user device.

20 Claims, 6 Drawing Sheets

(56) References Cited

U.S. PATENT DOCUMENTS

| | | | | |
|---|---|---|---|---|
| 2008/0016192 | A1* | 1/2008 | Smith | G06F 9/4843 |
| | | | | 709/223 |
| 2008/0168469 | A1* | 7/2008 | Feingold | H04L 69/24 |
| | | | | 719/313 |
| 2016/0226792 | A1* | 8/2016 | Tamas | G06F 9/5038 |
| 2017/0048308 | A1 | 2/2017 | Qaisar | |
| 2019/0222518 | A1* | 7/2019 | Bernat | H04L 47/2425 |
| 2020/0351336 | A1* | 11/2020 | Campbell | H04L 67/1008 |
| 2021/0037113 | A1* | 2/2021 | Wang | G06F 9/4887 |
| 2021/0160145 | A1* | 5/2021 | Barnard | H04L 41/20 |
| 2021/0271403 | A1* | 9/2021 | Balle | G06F 9/3891 |
| 2021/0307018 | A1* | 9/2021 | Qaisrani | H04W 4/50 |
| 2021/0359957 | A1* | 11/2021 | Patel | H04L 47/788 |

FOREIGN PATENT DOCUMENTS

| | | |
|---|---|---|
| CN | 110213327 | 9/2019 |
| WO | 2017035536 | 3/2017 |
| WO | 2019179471 | 9/2019 |

OTHER PUBLICATIONS

Mell et al., "The NIST Definition of Cloud Computing", NIST, Special Publication 800-145, Sep. 2011, 7 pages.

Overby, "Edge computing by the Nos. 9 compelling stats", https://enterprisersproject.com/article/2020/4/edge-computing-9-compelling-stats, Apr. 23, 2020, 4 pages.

* cited by examiner

OPTIMIZING DEVICE-TO-DEVICE COMMUNICATION PROTOCOL SELECTION IN AN EDGE COMPUTING ENVIRONMENT

BACKGROUND

Aspects of the present invention relate generally to distributed computing systems and, more particularly, to optimizing device-to-device communication protocol selection in an edge computing environment.

A cloud is an information technology (IT) environment that abstracts, pools, and shares IT resources across a network. An edge is a computing location at the edge of a network, along with the hardware and software at those physical locations. Cloud computing is the act of running workloads within clouds, while edge computing is the act of running workloads on edge devices.

SUMMARY

In a first aspect of the invention, there is a computer-implemented method including: receiving, by a computing system, a request for a service from a user device, wherein the computing system is one of plural edge computing devices in an edge computing environment; determining, by the computing system, computational tasks performed in providing the service; selecting, by the computing system and using a machine learning model, a set of the edge computing devices to perform the computational tasks and communication protocols for the set of the edge computing devices to use while performing the computational tasks, wherein the machine learning model is configured to select the set of the edge computing devices and the communication protocols based on minimizing the time to perform the computational tasks; and sending, by the computing system and to the set of the edge computing devices, instructions to perform the computational tasks, thereby causing the set of the edge computing devices to perform the service in response to the request from the user device.

In another aspect of the invention, there is a computer program product including one or more computer readable storage media having program instructions collectively stored on the one or more computer readable storage media. The program instructions are executable to: receive a request for a service from a user device, wherein the computing device is one of plural edge computing devices in an edge computing environment; determine computational tasks performed in providing the service; select, using a machine learning model, a set of the edge computing devices to perform the computational tasks and communication protocols for the set of the edge computing devices to use while performing the computational tasks, wherein the machine learning model is configured to select the set of the edge computing devices and the communication protocols based on minimizing the time to perform the computational tasks; and send, to the set of the edge computing devices, instructions to perform the computational tasks, thereby causing the set of the edge computing devices to perform the service in response to the request from the user device.

In another aspect of the invention, there is system including a processor, a computer readable memory, one or more computer readable storage media, and program instructions collectively stored on the one or more computer readable storage media. The program instructions are executable to: receive a request for a service from a user device, wherein the computing device is one of plural edge computing devices in an edge computing environment; determine computational tasks performed in providing the service; select, using a machine learning model, a set of the edge computing devices to perform the computational tasks and communication protocols for the set of the edge computing devices to use while performing the computational tasks, wherein the machine learning model is configured to select the set of the edge computing devices and the communication protocols based on minimizing the time to perform the computational tasks; and send, to the set of the edge computing devices, instructions to perform the computational tasks, thereby causing the set of the edge computing devices to perform the service in response to the request from the user device.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Aspects of the present invention relate generally to distributed computing systems and, more particularly, to optimizing device-to-device communication protocol selection in an edge computing environment. According to aspects of the invention, an edge computing system is configured to: train a machine learning model; receive a request for a service from a user device; determine computational tasks performed in providing the service; select, using the machine learning model, a set of edge computing devices to perform the computational tasks and communication protocols for the set of the edge computing devices to use while performing the computational tasks; and send instructions to the set of edge computing devices to perform the computational tasks. In accordance with aspects of the invention, the model is trained using historic performance data of the edge computing devices and using reinforcement learning to develop a policy that minimizes processing time, bandwidth usage, and power consumption in performing a set of computational tasks within a time defined by an SLA. In this manner, implementations of the invention determine an optimal solution of edge computing devices and device-to-device communication protocols for performing tasks involved in providing the service requested by the user device within a time defined by an SLA.

In distributed computing systems that span beyond traditional data centers and cloud environments, the speed of underlying network connectivity is an important factor that affects execution of a task or transaction. For instance, when multiple wireless devices are connected to a hotspot, the per user available network bandwidth is reduced, with the result being that a user activity takes a longer time to complete than was expected. Also, while any user or processing activity is being performed, if the devices are themselves moving, then wireless bandwidth is needed for the device along its movement path. Otherwise, the same user activity takes a longer time comparatively to complete.

Service providers are faced with the challenge of providing software applications that deliver near real-time responsiveness desired by customers. Streaming media and mobile consumer transactions are two examples of application-based services where the end user expects low latency and high reliability. Edge computing provides a way to meet the performance demands of today's data-intensive and latency-sensitive applications by positioning computing resources at the edge of a network, which is closer to the end user where the service is delivered.

User or processing activities on an edge device sometimes have a performance requirement and a defined priority within a defined service level agreement (SLA) within which the activity must be completed. Prioritized activities may be processed first in these situations.

In any geographic location where an edge device is operating, the devices may communicate with each other in various modes of communication (also called communication protocols). The same devices may also connect to a remote cloud server over a wireless network. There are various types of device-to-device communication systems that can be applied in edge computing which can be selected appropriately based on the use case and situation or context. A first example is laser communication, which are suitable for high performance optical communication backbones in high-altitude communication platforms. Another example is Li-Fi communication, which is an optical wireless technology that offers excellent bandwidth and is suitable in areas with high electromagnetic interference such as hospitals. Another example includes popular communication modes such as Wi-Fi, Bluetooth, NFC, RFID, etc. Another example includes mobile (e.g., cellular) communication technologies such as GPRS/EDGE, GSM, 4G LTE, 5G etc. Another example is satellite-based communication, which offers extremely high range but requires line of sight. These different communication protocols have different characteristics as shown in Table 1.

TABLE 1

| Characteristic | Laser | Li-Fi | Wi-Fi | 5G | Satellite |
| --- | --- | --- | --- | --- | --- |
| Speed | 1 Gbit/s | 100 Gbit/s | 72-600 Mbit/s | 50 Mbit/s - 20 Gbit/2 | 100 Mbit/s |
| Directionality | Direction of laser beam | Direction of light source | Omni-directional | Omni-directional | Line of sight |
| Distance (transmission range) | Kilo-meters | 10 meters | 100 meters | 500 meters | Un-limited |
| Power Consumption | High | Medium | Low | Low | Low |

While performing any computational task in edge computing, data transportation time and data processing time are factors that affect the ability to meet the SLA or performance metrics for the task. For an edge computing computational task that has a bound completion time, e.g., as defined in an SLA, there is a need for a system to identify which edge computing devices to use for data processing for completing the task and how data is transported to such devices optimally.

Aspects of the invention address this need by providing an artificial intelligence (AI) based system that automatically identifies edge computing devices to perform computational tasks and identifies communication protocols to use for transmitting data between the identified edge computing devices while performing the computational tasks. In this manner, aspects of the invention utilize AI to select an optimal subset of edge computing devices and communication protocols to complete computational tasks within a defined performance metric (e.g., a time limit defined in an SLA). In embodiments, the AI includes a machine learning model that is configured to select the optimal subset of edge computing devices and communication protocols to minimize latency while meeting a time limit defined in an SLA. In this manner, implementations of the invention provide a technical solution to the technical problem of latency within edge computing systems that affects compliance with SLA requirements.

In aspects of the invention, in an edge and cloud computing ecosystem, the system analyzes the associated SLAs for a computational task and identifies edge computing devices to perform the computational task so that the required computing resources (type as well as number) can be made available for executing the computational task and complete the task in a timely fashion. In embodiments, based on the assessed volume of data to be transported and processed, and a defined time available to complete the computational task, the system identifies appropriate device-to-device communication protocols or modes of communication (from several available choices) so that the computational task is completed within the defined time. In embodiments, based on the defined SLA or timeline for completing the computational task, and based on the selection of the edge computing devices to perform the computational task, the system optimizes the aggregated processing power and anticipated network bandwidth usage for data transportation and processing that occur while performing the computational task. In embodiments, when one or more edge computing devices are already loaded with other processing tasks and a new computing activity of greater priority is introduced into the system, the system seamlessly swaps one or more of the edge computing devices (or the tasks assigned to them), so the power consumption for data transmission on the chosen edge computing devices is optimized in support of completion of a higher priority computational task within the defined SLA.

Aspects of the invention provide an improvement to distributed computing systems. In particular, implementations of the invention provide a technical solution to the technical problem of latency within edge computing systems that affects compliance with SLA requirements. In embodiments, the technical solution includes utilizing AI to select an optimal subset of edge computing devices and communication protocols to complete a computational task within a defined performance metric (e.g., a time limit defined in an SLA).

It should be understood that, to the extent implementations of the invention collect, store, or employ personal information provided by or obtained from individuals, such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
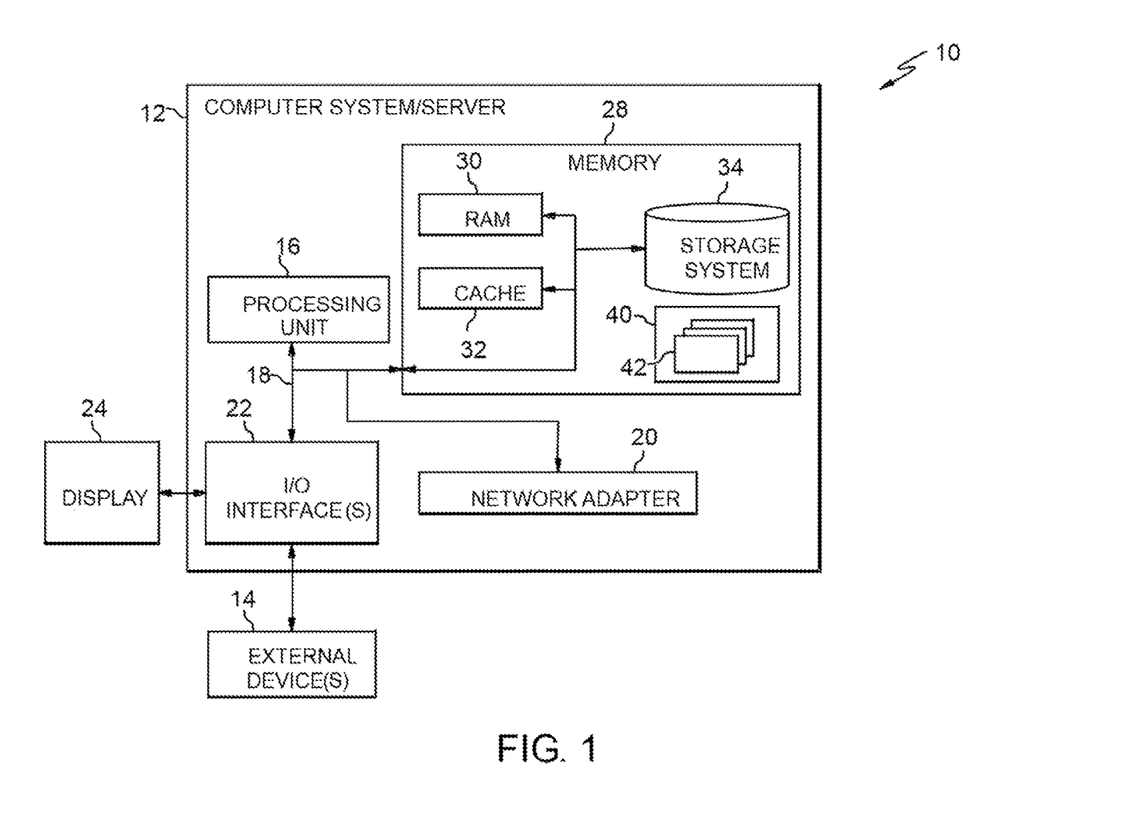
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
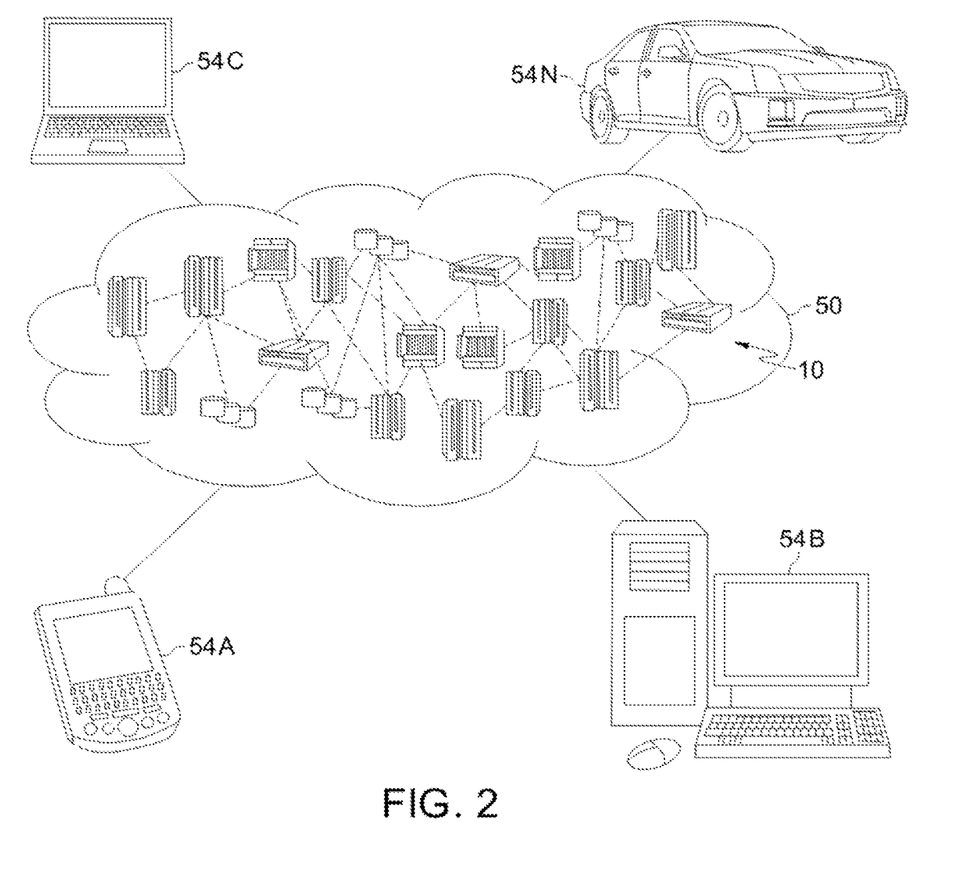
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
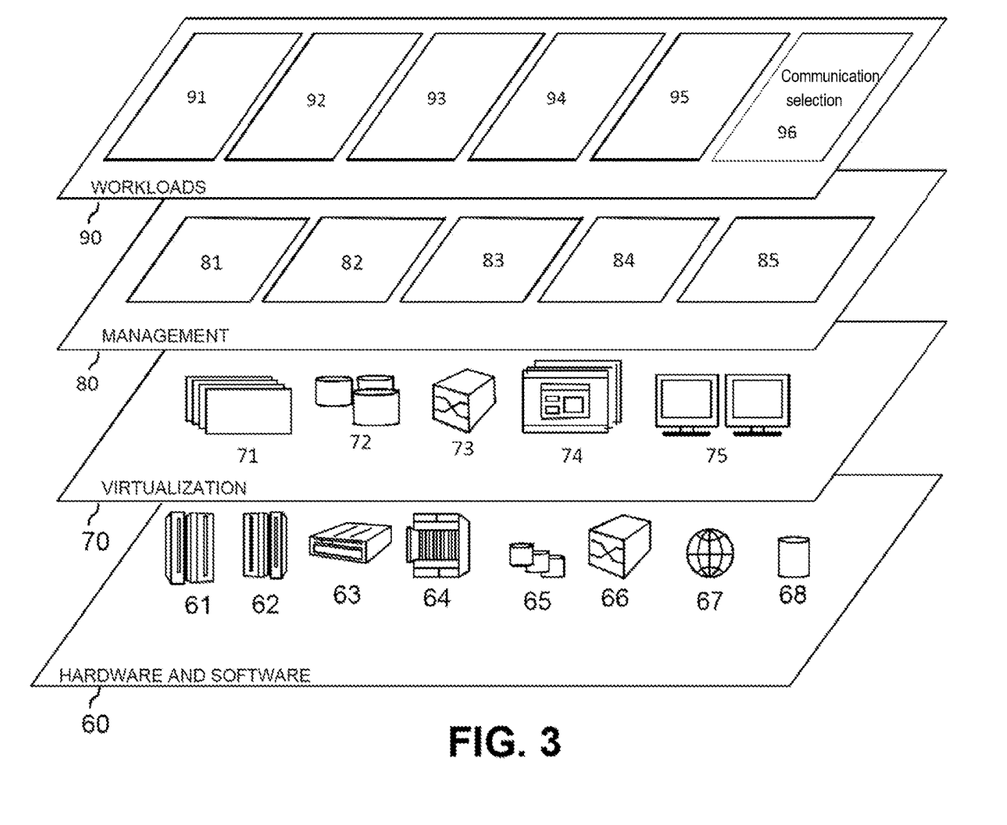
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and communication selection 96.

Implementations of the invention may include a computer system/server 12 of FIG. 1 in which one or more of the program modules 42 are configured to perform (or cause the computer system/server 12 to perform) one of more functions of the communication selection 96 of FIG. 3. For example, the one or more of the program modules 42 may be configured to: train a machine learning model; receive a request for a service from a user device; determine computational tasks performed in providing the service; select, using the machine learning model, a set of edge computing devices to perform the computational tasks and communication protocols for the set of the edge computing devices to use while performing the computational tasks; and send instructions to the set of edge computing devices to perform the computational tasks.

Figure 4:
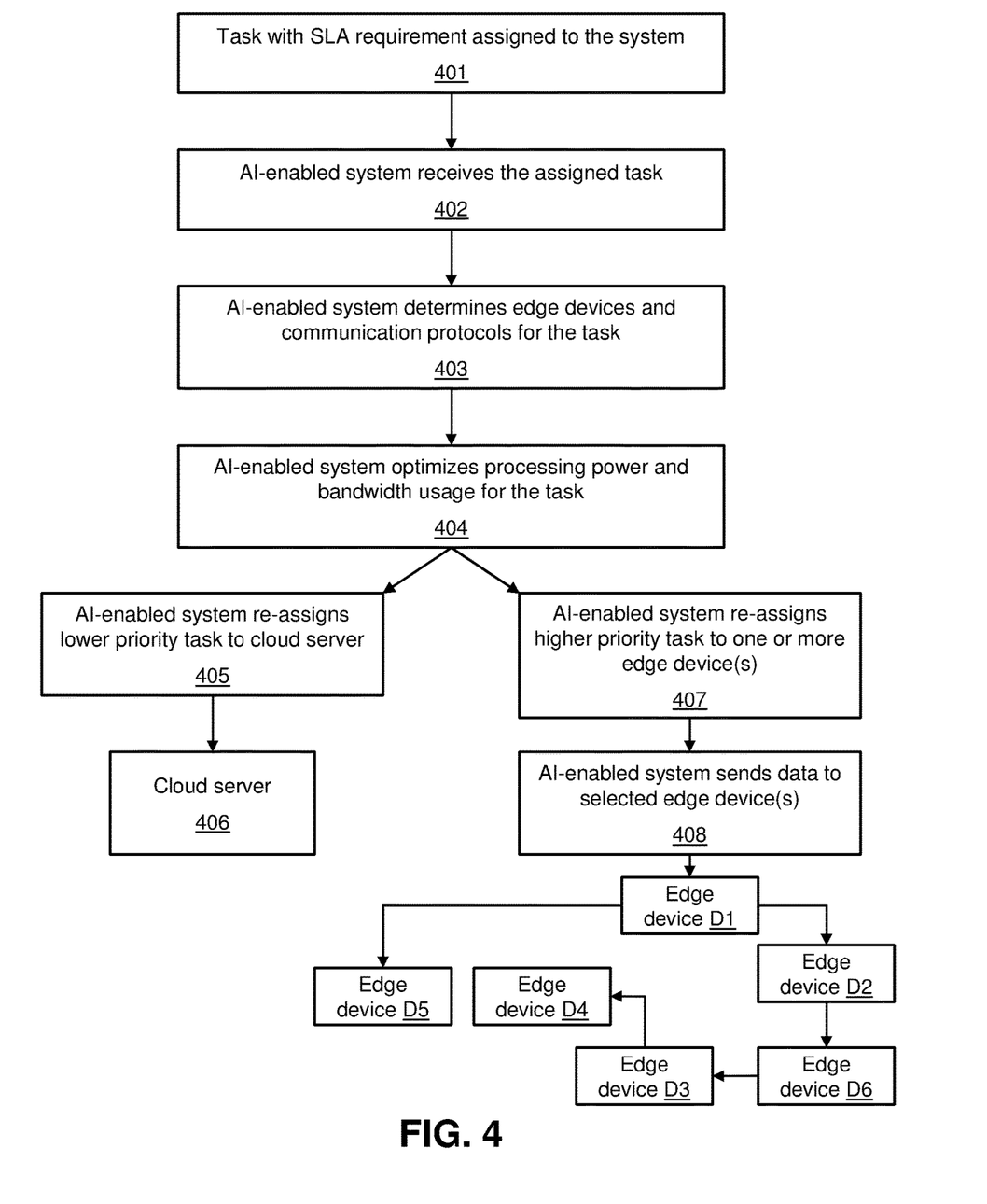
FIG. 4 shows a block diagram of an exemplary process for handling computational tasks in an edge computing system in accordance with aspects of the invention.

FIG. 4 shows a block diagram of an exemplary process for handling a computational task in an edge computing system in accordance with aspects of the invention. At step 401, a service provider assigns a computational task with an SLA requirement to the edge computing system to be completed by the edge computing system. In embodiments, the computational task originates from a service request from an end user computing device. In one example, the service provider receives the service request from the end user and assigns the computational task to the edge computing system. The computational task may include plural computational tasks that are performed to provide the requested service, which may be a request to stream media to the end user computing device or a request to process a transaction, for example. At step 402, an AI-enabled system included in the edge computing system receives the assigned computational task. At step 403, the AI-enabled system determines: (i) a subset of edge computing devices included in the edge computing system to perform the assigned computational task; and (ii) communication protocols to be used between the selected devices when performing the assigned computational task.

In embodiments, the AI-enabled system utilizes a machine learning model to determine the subset of edge computing devices and the communication protocols at step 403. In a specific example, the AI-enabled system uses a machine learning model that is trained using Markov's decision process with reinforcement learning to derive optima for various choices to be made in the selection of edge computing devices and communication protocols for meeting the SLA of computational tasks. Reinforcement learning is a type of machine learning that allows machines and software agents to automatically determine the ideal behavior within a specific context in order to maximize its performance. A Markov decision process is a 4-tuple (S, A, Pa, Ra) where: "S" is a set of states called the state space; "A" is a set of actions called the action space; Pa(s,s') is the probability that action "a" in state "s" at time "t" will lead to state "s'" at time "t+1"; and "Ra" is the immediate reward (or expected immediate reward) received after transitioning from state "s" to state "s'" due to action "a". In embodiments, the AI-enabled system utilizes a Markov decision process with reinforcement learning to generate a policy (e.g., train a model) that achieves a set of objectives based on a set of dependent factors. In embodiments, the set of objectives includes minimizing processing time required for a computational activity, maximizing availability of computing resources, minimizing bandwidth consumption, and conforming to SLA requirements. In embodiments, the set of dependent factors includes type of edge computing devices, number of edge computing devices, communication modes for data transport between the edge computing devices, and distance and direction of edge computing devices to other edge computing devices.

With continued reference to FIG. 4, in embodiments step 403 includes the AI-enabled system estimating a volume of data to be transported in the process of performing the assigned computational task. In one example, the AI-enabled system identifies the time required to complete the assigned computational task and decides which among the available edge computing devices are to be selected and which device-to-device communication protocols are appropriate to complete the assigned computational task within the defined timeline.

With continued reference to FIG. 4, at step 404 the AI-enabled system optimizes the processing power and bandwidth usage for data transportation when performing the assigned computational task. Optionally, at step 405 the AI-enabled system re-assigns one or more lower priority tasks from one of the selected edge computing devices to a cloud computing system 406 (e.g., for completion at a cloud server). Optionally, at step 407 the AI-enabled system re-assigns one or more higher priority tasks to one or more of the edge computing devices. At step 408, the AI-enabled system sends data to the subset of edge computing devices (determined at step 403) to perform the assigned computational task. FIG. 4 shows an example in which the determined subset of edge computing devices includes six different edge computing devices D1-D6. In the example shown in FIG. 4, the determined subset of edge computing devices D1-D6 transport data to one another (i.e., data involved in performing the assigned computational task) using communication protocols specified by the AI-enabled system. For example, the AI-enabled system might determine that laser communication is the optimum protocol for sending data from D1 to D2 because high data volume transfer is needed, and laser protocol is supported. In this example, the AI-enabled system might concurrently determine that Li-Fi communication is the optimum protocol for sending data from D2 to D6 because the devices are within the distance range limit of the protocol. In this example, the AI-enabled system might concurrently determine that Wi-Fi communication is the optimum protocol for sending data from D6 to D3, from D3 to D4, and from D1 to D5. In this manner, the AI-enabled system determines a subset of edge computing devices to perform the assigned computational task and determines communication protocols to be used between the selected devices when performing the assigned computational task.

With continued reference to FIG. 4, in accordance with aspects of the invention, the system identifies each computing device in an edge computing environment, along with the specifications and capabilities of each device. In embodiments, the system uses a discovery process to locate the edge computing devices (e.g., D1-D6) that are part of the edge computing environment. As part of the discovery process, the system polls the discovered devices for their capabilities. The discovered capabilities of each edge computing device may include processing capacity of the device, storage capacity of the device, network speed for the device, and communication protocols supported by the device.

The edge computing devices can be static (i.e., not moving) or mobile (i.e., moving). In embodiments, for edge computing devices that are static, the system identifies the relative position of the devices in a surrounding. In embodiments, for edge computing devices that are static, the system identifies a real-time position of each device so the devices can be steered and navigated to desired surroundings. The system may determine device locations using network locating techniques (e.g., triangulation, etc.) and/or using locating data provided by the devices.

The edge computing devices in the ecosystem may support different types of communication protocols data (also referred to as transmission protocols). The data transmission protocol supported by the edge computing devices can be any of the following or a combination thereof: laser communications; Li-Fi communications; communication modes such as Wi-Fi, Bluetooth, NFC, RFID; mobile (cellular) communication technologies; and satellite-based communications.

In embodiments, the edge computing devices communicate with each other to participate collaboratively in edge processing, e.g., performing a computational task in the edge computing environment. The edge computing devices may also communicate with a cloud server for other data processing and data communications.

In accordance with aspects of the invention, the system includes an AI component that brings with it supervised and unsupervised learning access to a historically built knowledge corpus. In embodiments, the AI component is provided via an AI-enabled computing device that is included in the edge computing system.

In embodiments, the system collects performance data from the edge computing devices about how the edge computing devices perform while completing computational tasks. The performance data may be for performance parameters including processing speed, amount of data handled, types of devices involved, and task completion times. In embodiments, the system saves this performance data for all the edge computing devices in a knowledge corpus. In embodiments, the system analyzes the knowledge corpus to determine historic values for the performance parameters for each of the edge computing devices.

Still referring to FIG. 4, in accordance with aspects of the invention, the system identifies which edge computing devices, of the already identified devices, are engaged already and if they can perform new edge computing tasks assigned to them. In embodiments, the system polls the known devices to determine their current workload in terms of scheduled tasks, current processing capacity used versus available, current memory used versus available, etc.

In implementations, the system records and stores data that defines power consumption metrics of the edge computing devices when the devices are performing computational tasks and/or device-to-device data transmission. In embodiments, the system updates the knowledge corpus with this power consumption data.

According to aspects of the invention, when a computational task is assigned to the edge computing environment and an applicable SLA is provided to complete the task, the system estimates whether one or more of the edge computing devices of the edge computing environment can complete the computational task within the defined SLA. In embodiments, the system determines the current available capacity of the edge computing devices, estimates a processing time (e.g., how long) to complete the task using the determined current available capacity of the edge computing devices, and compares the estimated time to the SLA, thereby validating whether the current available processing power and storage capacity are sufficient to complete the computational task within the defined SLA. In the event the system determines that the available aggregate or individual capacity of the edge computing devices is insufficient to complete the computational task, the system then determines whether some or all of the workload of the computational task can be offloaded to a cloud computing backbone (e.g., a cloud server that is not part of the edge computing environment). In embodiments, when the system decides to split the computational task in this manner (e.g., between one or more edge computing devices and one or more cloud servers), the system splits the data accordingly between the devices so that the computational task can be completed within the defined timeline.

With continued reference to FIG. 4, in embodiments the system determines the positions (e.g., physical locations) of the edge computing devices relative to one another and, based on the volume of data to be transmitted from one device to another, determines a communication protocol for the devices to use when transmitting data to each other while performing the computational task. In embodiments, the AI-enabled system determines the communication protocols to use for device-to-device communication between the devices (e.g., devices D1-D6) using a model. In one example, the model is the machine learning model that is trained using Markov's decision process with reinforcement learning using data from the knowledge corpus and objectives and dependent factors described herein. In additional aspects, the system identifies an amount of power consumption needed for the determined data transmissions (e.g., the respective amounts of data transmitted from one device to another using the respective communication protocols determined using the model). In embodiments, the system chooses devices and communication protocols that optimize (e.g., minimize) the power consumption while still completing the computational task within the time defined in the SLA.

Figure 5:
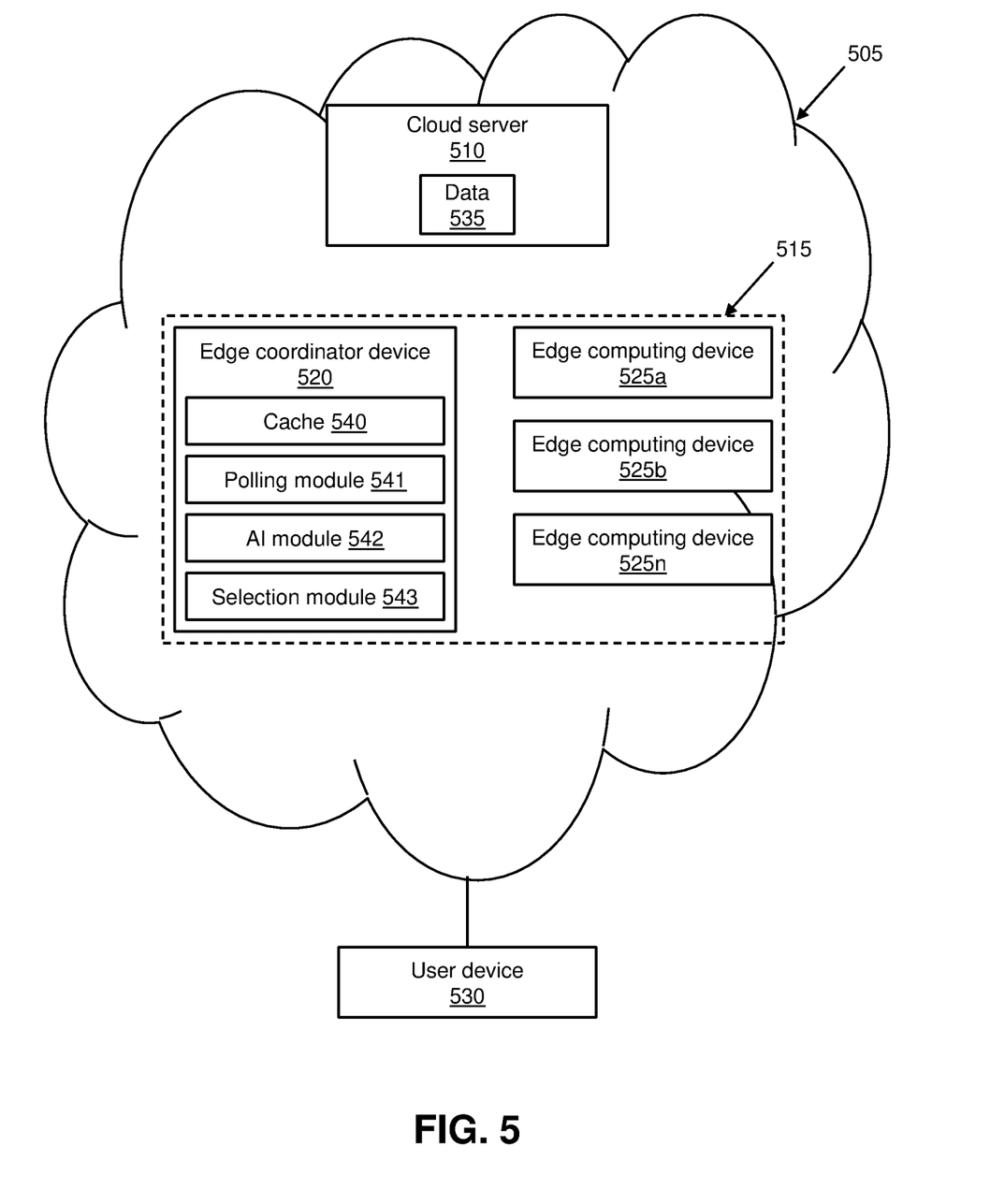
FIG. 5 shows a block diagram of an exemplary environment in accordance with aspects of the invention.

FIG. 5 shows a block diagram of an exemplary environment 500 in accordance with aspects of the invention. In embodiments, the environment 500 includes a distributed computing environment 505 that includes at least one cloud server 510 and an edge computing environment 515. In embodiments, the edge computing environment 515 includes an edge coordinator device 520 and edge computing devices 525a, 525b, . . . , 525n. Each of the cloud server 510, edge coordinator device 520, and edge computing devices 525a-n is a computing device comprising one or more elements of the computer system/server 12 of FIG. 1. The distributed computing environment 505 includes a network or combination of networks such as Private, Community, Public, or Hybrid clouds, and may include the Internet. Each of the cloud server 510, edge coordinator device 520, and edge computing devices 525a-n may communicate with one another in the distributed computing environment 505, directly or indirectly, using network communications. In a particular embodiment, the edge coordinator device 520 corresponds to the AI-enabled device and the edge computing devices 525a-n correspond to the edge devices D1-D6 of FIG. 4, with the edge coordinator device 520 being specially programmed to carry out the functions of the AI-enabled device described with respect to FIG. 4.

In accordance with aspects of the invention, the edge coordinator device 520 and edge computing devices 525a-n are at an edge of the distributed computing environment 505 compared to the cloud server 510. Being at the edge of a network means that an end user device 530 is closer to these edge devices than it is to the cloud server 510. In one embodiment, closer in this context means physical distance. In an example of this embodiment, the user device 530 is physically located in Pune, India, the edge devices (edge coordinator device 520 and edge computing devices 525a-n) are physically located in Hyderabad, India, and the cloud server 510 is located in Chicago, USA. Pune is physically closer to Hyderabad than it is to Chicago, so the user device 530 is physically closer to the edge devices than it is to the cloud server. Closer in aspects of the invention is not limited to physical distance and can be defined using other measures that affect network time to deliver content to the user device 530.

Still referring to FIG. 5, the cloud server 510 stores data 535 that is used for providing services to end users via their user device 530. The user device 530 may comprise a user computing device such as a desktop computer, laptop computer, tablet computer, smartphone, etc. The user device 530 may request the service via a website or software app, for example. The data 535 stored at the cloud server 510 may comprise, for example, streaming data, financial data, etc. In embodiments, at least one of the edge devices (e.g., edge coordinator device 520) stores a replicated copy of the data 535, e.g., in a cache 540. In this manner, when the user device 530 requests a service that uses the data 535, some or all of the computational tasks involved in answering the request are performed by the edge devices using the replicated copy rather than performing all the computational tasks by the cloud server 510. Performing some or all of the computational tasks at the edge devices (rather than at the cloud server) reduces the amount of time that data is being transmitted from one device to another, due to the physical distances between the respective devices. As a result, performing some or all of the computational tasks at the edge devices (rather than at the cloud server) reduces the latency of answering the request, which is desired by the end user. However, this act alone (i.e., performing computational tasks at the edge devices) does not always minimize the latency enough to answer the request in a time defined by an SLA. As described herein, customers (e.g., end users) increasingly demand extremely low latency (e.g., near real time responsiveness) to their service requests and, due to the competitive nature of the marketplace, these demands are often incorporated in SLAs as defined times within a requested service must be provided. Aspects of the invention address this challenge and, thus, provide an improvement in distributed computing, by further reducing the latency involved in answering service requests by: selecting a set of edge computing device 525a-n to perform the computational tasks involved in answering the request, and selecting optimal communication protocols for the edge computing device 525a-n to use when communicating with each other while performing the computational tasks involved in answering the request, wherein the devices and communication protocols are selected using a machine learning model that is trained to select combinations that minimize processing time, bandwidth usage, and power consumption.

As shown in FIG. 5, in embodiments the edge coordinator device 520 includes a polling module 541, an AI module 542, and a selection module 543, each of which may comprise one or more program modules such as program modules 42 described with respect to FIG. 1. The edge coordinator device 520 may include additional or fewer modules than those shown in FIG. 5. In embodiments, separate modules may be integrated into a single module. Additionally, or alternatively, a single module may be implemented as multiple modules. Moreover, the quantity of devices and/or networks in the environment is not limited to what is shown in FIG. 5. In practice, the environment may include additional devices and/or networks; fewer devices and/or networks; different devices and/or networks; or differently arranged devices and/or networks than illustrated in FIG. 5.

According to aspects of the invention, the polling module 541 is configured to obtain performance data from each of the edge computing device 525a-n. In embodiments, the performance data includes maximum processing capacity of the particular edge computing device, current processing capacity of the particular edge computing device, maximum storage (memory) capacity of the particular edge computing device, current storage (memory) capacity of the particular edge computing device, network speed of the particular edge computing device, and communications protocols supported by the particular edge computing device. In embodiments, the polling module 541 periodically runs a discovery process to identify new edge computing devices that connect to the edge computing environment 515. When a new device is discovered, the polling module 541 communicates with the device to determine the device's identification (e.g., name, MAC address, network address, etc.), device type, maximum processing capacity, maximum memory, and communications protocols supported. In embodiments, the polling module 541 maintains a list of this information for all the edge computing device 525a-n in the edge computing environment 515. In embodiments, the polling module 541 periodically polls each device in the list to determine current properties of each device including but not limited to: current processing capacity, current memory, current physical location, and current network speed. In embodiments, the polling module 541 periodically polls each device in the list to determine actual (historic) performance data associated with tasks performed by the devices, the actual performance data including but not limited to: an identity of a task performed, an amount of time taken to perform the task, an amount of processing used to perform the task, an amount of memory used to perform the task, and an amount of data transmitted to perform the task. In embodiments, the polling module 541 stores this data in a knowledge corpus.

According to aspects of the invention, the AI module 542 is configured to analyze the knowledge corpus to determine historic processing speeds of the devices included in the list, amounts of data each device in the list can handle, and types of devices involved in data processing and their task completion times. In embodiments, the AI module 542 is programmed to use machine learning to analyze the knowledge corpus in this manner. This machine learning may be supervised or unsupervised.

According to further aspects of the invention, the AI module 542 is configured to create a machine learning model for selecting a subset of edge computing devices 525a-n to perform an assigned computational task, and communication protocols for the selected subset of devices to use while performing the computational task. In one example, the AI module 542 creates the machine learning model using Markov's decision process with reinforcement learning. In this example, the Markov's decision process technique is used to derive optima for various decision choices to be made when selecting the subset of devices and their device-to-device communication modes for meeting the SLA (e.g., time requirement) of the assigned computational task. In this example, the AI module 542 uses the actual performance data as the training data for creating and training the model, and creates and trains the model using Markov's decision process with reinforcement learning to achieve a set of objectives based on a set of dependent factors. In embodiments, the set of objectives includes minimizing time required for a computational task, maximizing availability of computing resources of the edge computing devices 525a-n, minimizing bandwidth consumption by the edge computing devices 525a-n, minimizing power consumption by the edge computing devices 525*a-n*, and conforming to SLA requirements of the service request (e.g., a time to complete the computational task). In embodiments, the set of dependent factors includes type of edge computing devices 525*a-n*, number of edge computing devices 525*a-n*, communication modes for data transport between the edge computing devices 525*a-n*, and distance and direction of edge computing devices 525*a-n* to other edge computing devices 525*a-n*. In embodiments, the AI module 542 implements the Markov's decision process with reinforcement learning using a set of environment and agent states (e.g., "S") with multiple vectors of: type of edge computing devices, maximizing availability of computing resources of the edge computing devices, minimizing bandwidth consumption by the edge computing devices, number of edge computing devices, and communication modes for data transport between the edge computing devices. In embodiments, the AI module 542 implements the Markov's decision process with reinforcement learning using a set of actions (e.g., "A") of an agent, the actions including but not limited to: increasing or decreasing the number of edge computing devices, increasing or decreasing the distance between the edge computing devices, increasing or decreasing the number of available communication modes for data transport between the edge computing devices and their speeds, and increasing or decreasing the bandwidth consumption by the edge computing devices. In this manner, using the actual performance data and using Markov's decision process with reinforcement learning with these agent states and actions, the AI module 542 creates and trains a machine learning model that outputs a subset of edge computing devices 525*a-n* to perform an assigned computational task and communication protocols for the selected subset of devices to use while performing the computational task. In embodiments, the inputs to this machine learning model include: current processing capacity, current memory, current physical location, communication protocols supported, the computational task to be performed, and the time defined in the SLA to complete the task.

With continued reference to FIG. 5, in embodiments the selection module 543 is configured to: receive a request for a service from the user device 530, determine computational tasks performed in providing the service, and select a set of the edge computing devices 525*a-n* to perform the computational tasks and communication protocols for the set of the edge computing devices 525*a-n* to use while performing the computational tasks. In embodiments, a user utilizes the user device 530 to request a service, such as streaming media or a financial transaction. In embodiments, the edge coordinator device 520 and the edge computing devices 525*a-n* are owned or leveraged by a service provider associated with the services provided by the cloud server 510. In one example, the service provider provides a website or software app by which the user may utilize the user device 530 to request the service. In this example, when the user requests the service using the user device 530, the request is routed to the edge coordinator device 520 for performing the service in response to the request. In embodiments, in response to receiving a request for a service, the selection module 543 determines any SLA requirements associated with the request, e.g., by accessing stored data that defines respective SLA requirements for respective services. In embodiments, in response to receiving a request for a service, the selection module 543 of the edge coordinator device 520 determines computational tasks that are to be performed for providing the service, e.g., by accessing stored data that defines respective sets of tasks to be performed for respective services. In embodiments, the selection module 543 determines an estimated time to perform each of the computation tasks based on the historic data of the edge computing devices 525*a-n* performing the same tasks for previous requests.

In accordance with aspects of the invention, the selection module 543 determines which of the edge computing devices 525*a-n* are currently engaged with other tasks and to what extent. In embodiments, the selection module 543 makes this determination using data obtained by the polling module 541, e.g., current tasks being performed, current processing capacity, current memory, current physical location, and current network speed of each of the edge computing devices 525*a-n*.

In accordance with aspects of the invention, the selection module 543 uses the current state of the edge computing devices 525*a-n*, the estimated times to perform the computational tasks, and the machine learning model to select a set of the edge computing devices 525*a-n* to perform the computational tasks and communication protocols for the set of the edge computing devices 525*a-n* to use while performing the computational tasks. In embodiments, the selection module 543 provides the following inputs to this machine learning include: current processing capacity of each of the edge computing devices 525*a-n*, current memory of each of the edge computing devices 525*a-n*, current physical location of each of the edge computing devices 525*a-n*, communication protocols supported of each of the edge computing devices 525*a-n*, estimated times to perform the computational tasks, and the time defined in the SLA to complete the tasks for providing the service. In response to these inputs, the model outputs the selected set of the edge computing devices 525*a-n* to perform the computational tasks and communication protocols for the set of the edge computing devices 525*a-n* to use while performing the computational tasks. Because the model is trained using historic performance data of the edge computing devices 525*a-n*, and because the model is trained using reinforcement learning to develop a policy that minimizes time, bandwidth usage, and power consumption, it follows that the output set of edge computing devices 525*a-n* and communication protocols is a determined optimal solution for performing the computational tasks for this particular requested service while minimizing time, bandwidth usage, and power consumption in doing so.

With continued reference to FIG. 5, in response to determining set of the edge computing devices 525*a-n* and the communication protocols, the selection module 543 sends instructions to the selected set of the edge computing devices 525*a-n* to perform the computational tasks. This may involve sending data to one or more of the selected ones of the edge computing devices 525*a-n*, the data being for use in performing one or more of the computational tasks. In embodiments, the data is from the cache 540 and is part of the replicated data from the cloud server. In this manner, the edge coordinator device 520 causes the set of the edge computing devices 525*a-n* to perform the service in response to the request from the user device 530. In this manner, the edge computing environment provides the requested service to the end user.

In accordance with additional aspects of the invention, in some situations the selection module 543 determines that one or more of the computational tasks cannot be performed by the set of edge computing devices within a time required by an SLA. For example, even though the machine learning model determines the set of devices and communication protocols in a manner that minimizes the time to complete the tasks, this minimized time might not satisfy the SLA. For example, there may be times that the edge computing devices 525a-n are performing so many other processes that they cannot also perform these new computational tasks in the time required by the SLA. In embodiments, when this occurs, the selection module 543 offloads at least one lower priority process from one or more of the set of edge computing devices to the cloud server 510. For example, one or more of the edge computing devices 525a-n might be performing tasks that do not have an SLA, or that have a time in the SLA that is greater than the time in the SLA of the current service request. These tasks with no SLA or a longer time to complete can be deemed as lower priority tasks, and their execution can be moved from the edge computing devices 525a-n to the cloud server 510 since latency is less critical for these tasks. In this situation, the selection module 543 sends an instruction to the one or more of the edge computing devices 525a-n to transfer the lower priority task to the cloud server 510. Doing so changes the current state of the edge computing devices 525a-n, and the selection module 543 then re-runs the selection process with this new current state of the edge computing devices 525a-n, seeking a set of devices and communication protocols that can complete all the tasks within the time defined by the SLA.

Figure 6:
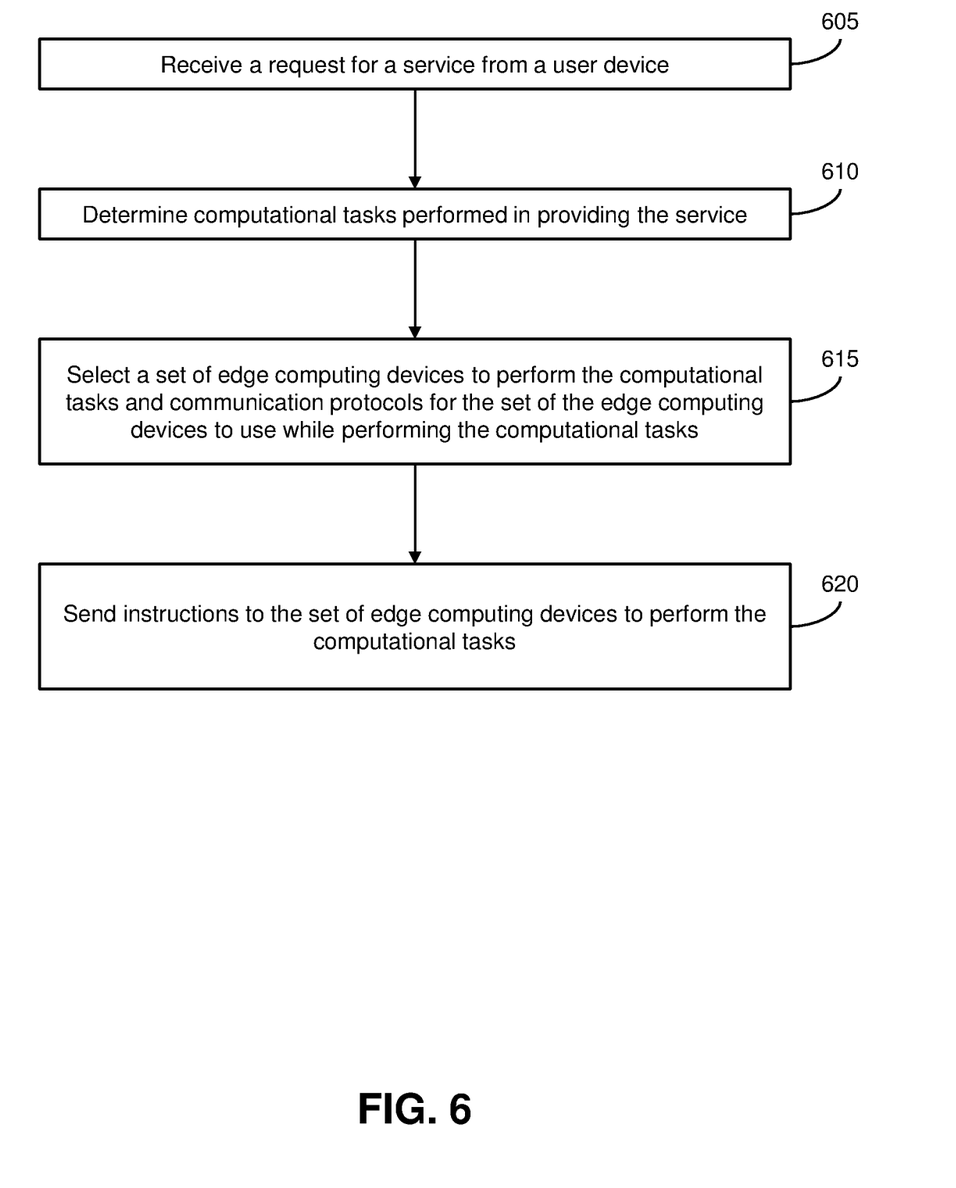
FIG. 6 shows a flowchart of an exemplary method in accordance with aspects of the invention.

FIG. 6 shows a flowchart of an exemplary method in accordance with aspects of the present invention. Steps of the method may be carried out in the environments of FIG. 5 and are described with reference to elements depicted in FIG. 5.

At step 605, the system receives a request for a service from a user device. In embodiments, and as described with respect to FIG. 5, the selection module 543 of the edge coordinator device 520 receives a request from the user device 530.

At step 610, the system determines computational tasks to be performed in providing the service that was requested at step 605. In embodiments, and as described with respect to FIG. 5, the selection module 543 of the edge coordinator device 520 determines computational tasks.

At step 615, the system selects a set of edge computing devices to perform the computational tasks that were determined at step 610 and communication protocols for the set of the edge computing devices to use while performing the computational tasks. In embodiments, and as described with respect to FIG. 5, the selection module 543 of the edge coordinator device 520 determines the set of edge computing devices using a machine learning model. In embodiments, and as described herein, the machine learning model is trained using historic performance data of the edge computing devices 525a-n and using reinforcement learning to develop a policy that selects devices and protocols to minimize time, bandwidth usage, and power consumption. As a result, selection of the set of edge computing devices 525a-n and communication protocols at step 615 is a determined optimal solution for performing the computational tasks for this particular requested service while minimizing time, bandwidth usage, and power consumption in doing so.

At step 620, the system sends instructions to the set of edge computing devices (selected at step 615) to perform the computational tasks. In embodiments, and as described with respect to FIG. 5, the selection module 543 of the edge coordinator device 520 sends instructions and data to the selected set of edge computing devices 525a-n. The selected set of edge computing devices 525a-n perform the compu-tational tasks and, while doing so, transmit data to one another using the communication protocols selected at step 615.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    receiving, by a computing system, a request for a service from a user device, wherein the computing system is one of plural edge computing devices in an edge computing environment;
    determining, by the computing system, a computational task performed in providing the service;
    selecting, by the computing system and using a machine learning model, a set of the edge computing devices to perform the computational task and communication protocols to be used between selected ones of the set of the edge computing devices while performing the computational task, wherein the machine learning model is configured to select the set of the edge computing devices and the communication protocols based on minimizing a time to perform the computational task; and
    sending, by the computing system and to the set of the edge computing devices, instructions to perform the computational task, thereby causing the set of the edge computing devices to perform the service in response to the request from the user device.

2. The method of claim 1, further comprising training the machine learning model using historic performance data of the plural edge computing devices in the edge computing environment.

3. The method of claim 2, wherein:
the historic performance data includes actual bandwidth usage and actual power consumption by respective ones of the edge computing devices; and
the machine learning model is configured to select the set of the edge computing devices and the communication protocols based on minimizing bandwidth usage and power consumption in performing the computational task.

4. The method of claim 2, wherein the training the machine learning model comprises training the machine learning model using a Markov's decision process with reinforcement learning.

5. The method of claim 1, wherein:
one or more of the edge computing devices stores a replicated copy of data stored at a cloud server; and
the sending instructions comprises sending data obtained from the replicated copy of data.

6. The method of claim 5, wherein a distance between the edge computing devices and the user device is shorter than a distance between the cloud server and the user device.

7. The method of claim 5, wherein the computational task comprises plural respective computational tasks, and further comprising:
determining one of the plural computational tasks cannot be performed by the set of edge computing devices within a time required by an SLA; and
in response to the determining, offloading at least one lower priority process from one or more of the set of edge computing devices to the cloud server.

8. A computer program product comprising one or more computer readable storage media having program instructions collectively stored on the one or more computer readable storage media, the program instructions executable to:
receive a request for a service from a user device, wherein the request is received by a computing device that is one of plural edge computing devices in an edge computing environment;
determine a computational task performed in providing the service;
select, using a machine learning model, a set of the edge computing devices to perform the computational task and communication protocols to be used between selected ones of the set of the edge computing devices while performing the computational task, wherein the machine learning model is configured to select the set of the edge computing devices and the communication protocols based on minimizing a time to perform the computational task; and
send, to the set of the edge computing devices, instructions to perform the computational task, thereby causing the set of the edge computing devices to perform the service in response to the request from the user device.

9. The computer program product of claim 8, wherein the program instructions executable to train the machine learning model using historic performance data of the plural edge computing devices in the edge computing environment.

10. The computer program product of claim 9, wherein:
the historic performance data includes actual bandwidth usage and actual power consumption by respective ones of the edge computing devices; and
the machine learning model is configured to select the set of the edge computing devices and the communication protocols based on minimizing bandwidth usage and power consumption in performing the computational task.

11. The computer program product of claim 9, wherein the training the machine learning model comprises training the machine learning model using a Markov's decision process with reinforcement learning.

12. The computer program product of claim 8, wherein:
one or more of the edge computing devices stores a replicated copy of data stored at a cloud server; and
the sending instructions comprises sending data obtained from the replicated copy of data.

13. The computer program product of claim 12, wherein a distance between the edge computing devices and the user device is shorter than a distance between the cloud server and the user device.

14. The computer program product of claim 12, wherein the computational task comprises plural computational tasks, and the program instructions executable to:
determine one of the plural computational tasks cannot be performed by the set of edge computing devices within a time required by an SLA; and
in response to the determining, offload at least one lower priority process from one or more of the set of edge computing devices to the cloud server.

15. A system comprising:
a processor, a computer readable memory, one or more computer readable storage media, and program instructions collectively stored on the one or more computer readable storage media, the program instructions executable to:
receive a request for a service from a user device, wherein the request is received by a computing device that is one of plural edge computing devices in an edge computing environment;
determine a computational task performed in providing the service;
select, using a machine learning model, a set of the edge computing devices to perform the computational task and communication protocols to be used between selected ones of the set of the edge computing devices while performing the computational task,
wherein the machine learning model is configured to select the set of the edge computing devices and the communication protocols based on minimizing a time to perform the computational task; and
send, to the set of the edge computing devices, instructions to perform the computational task, thereby causing the set of the edge computing devices to perform the service in response to the request from the user device.

16. The system of claim 15, wherein the program instructions executable to train the machine learning model using historic performance data of the plural edge computing devices in the edge computing environment.

17. The system of claim 16, wherein:
the historic performance data includes actual bandwidth usage and actual power consumption by respective ones of the edge computing devices; and
the machine learning model is configured to select the set of the edge computing devices and the communication protocols based on minimizing bandwidth usage and power consumption in performing the computational task.

18. The system of claim 15, wherein:
one or more of the edge computing devices stores a replicated copy of data stored at a cloud server; and the sending instructions comprises sending data obtained from the replicated copy of data.

19. The system of claim 18, wherein a distance between the edge computing devices and the user device is shorter than a distance between the cloud server and the user device.

20. The system of claim 18, wherein the computational task comprises plural computational tasks, and the program instructions executable to:
- determine one of the plural computational tasks cannot be performed by the set of edge computing devices within a time required by an SLA; and
- in response to the determining, offload at least one lower priority process from one or more of the set of edge computing devices to the cloud server.

* * * * *